US010583624B2

(12) United States Patent
Hecky et al.

(10) Patent No.: US 10,583,624 B2
(45) Date of Patent: Mar. 10, 2020

(54) HEATING DEVICE, COMPRISING TWO PRECEDING ARCUATE HOT PLATES, OF A TWO-SIDED MACHINE

(71) Applicant: BHS Corrugated Maschinen- und Anlagenbau GmbH, Weiherhammer (DE)

(72) Inventors: Thomas Hecky, Weiden (DE); Norbert Städele, Parkstein (DE); Gerald Frischolz, Marktredwitz (DE)

(73) Assignee: BHS Corrugated Maschinen- und Anlagenbau GmbH, Weiherhammer (DE)

( * ) Notice: Subject to any disclaimer, the term of this patent is extended or adjusted under 35 U.S.C. 154(b) by 217 days.

(21) Appl. No.: 15/567,751

(22) PCT Filed: Feb. 24, 2016

(86) PCT No.: PCT/EP2016/053828

§ 371 (c)(1),
(2) Date: Oct. 19, 2017

(87) PCT Pub. No.: WO2016/169675

PCT Pub. Date: Oct. 27, 2016

(65) Prior Publication Data

US 2018/0104925 A1 Apr. 19, 2018

(30) Foreign Application Priority Data

Apr. 20, 2015 (CN) .................... 2015 2 0236187 U

(51) Int. Cl.

| | |
|---|---|
| ***B32B 37/00*** | (2006.01) |
| ***B31F 1/28*** | (2006.01) |
| ***H05B 3/68*** | (2006.01) |

(52) U.S. Cl.

CPC ........... *B31F 1/285* (2013.01); *B31F 1/2813* (2013.01); *B31F 1/2872* (2013.01); *B31F 1/2877* (2013.01); *H05B 3/68* (2013.01)

(58) Field of Classification Search

USPC ........................................................ 156/499

See application file for complete search history.

(56) References Cited

U.S. PATENT DOCUMENTS 4,268,345 A * 5/1981 Semchuck ........... B29B 13/023 100/332
4,419,173 A 12/1983 Akiyama et al.
(Continued)

FOREIGN PATENT DOCUMENTS

DE 195 06 777 A1 8/1996
EP 0 574 872 A1 12/1993
(Continued)

*Primary Examiner* — James D Sells
(74) *Attorney, Agent, or Firm* — McGlew and Tuttle, P.C.

(57) ABSTRACT

A heating device of a two-sided machine has a stand which has a first arcuate hot plate and a wall on which a sleeve is provided. A second arcuate hot plate is arranged above the first arcuate hot plate. The second arcuate hot plate is connected to the sleeve by a connecting stem. The stand includes a cylinder unit, the piston rod of which is connected to the trailing end of the second arcuate hot plate. A second corrugated-cardboard ply and a first corrugated-cardboard ply are guided so as to run between the hot plates, whereas a third corrugated-cardboard ply is guided so as to run, above the second arcuate hot plate, through the second arcuate hot plate. The second arcuate hot plate is lowered by the cylinder unit in order to be placed in connection with the second corrugated-cardboard ply.

21 Claims, 8 Drawing Sheets

(56) References Cited

U.S. PATENT DOCUMENTS

| | | | | | |
|---|---|---|---|---|---|
| 4,923,560 | A | * | 5/1990 | Inselmann ............. | A41H 43/04 156/555 |
| 5,156,714 | A | | 10/1992 | Thomas | |
| 5,571,368 | A | * | 11/1996 | Barge ...................... | B32B 37/06 100/304 |

FOREIGN PATENT DOCUMENTS

| | | | |
|---|---|---|---|
| EP | 1 459 878 | A2 | 9/2004 |
| JP | S5725940 | A | 2/1982 |
| JP | 1-316257 | A | 12/1989 |
| JP | 6-57632 | U | 8/1994 |
| WO | 87/05062 | A1 | 8/1987 |

* cited by examiner

HEATING DEVICE, COMPRISING TWO PRECEDING ARCUATE HOT PLATES, OF A TWO-SIDED MACHINE

CROSS REFERENCE TO RELATED APPLICATIONS

This application is a United States National Phase application of International Application PCT/EP2016/053828 filed Feb. 24, 2016 and claims the benefit of priority under 35 U.S.C. § 119 of Chinese utility model application 2015 2023 6187.5 filed Apr. 20, 2015, the entire contents of which are incorporated herein by reference.

FIELD OF THE INVENTION

The present invention relates to a machine, in particular having a corrugated-cardboard processing device, and in particular having a heating device, comprising two preceding arcuate hot plates, of a two-sided machine.

BACKGROUND OF THE INVENTION

In a corrugated-cardboard production line, multiple corrugated-cardboard plies are connected using glue in a two-sided machine. According to the prior art, the two-sided machine is equipped with a long heating device for heating the corrugated cardboard and for achieving a bonding capability of the glue. Owing to the relatively great length of the heating device, it takes a long time for the corrugated cardboard to run through said heating device, which leads to a reduced production speed and to unsatisfactory productivity. Consequently, the entire arrangement takes up a relatively large amount of space.

SUMMARY OF THE INVENTION

The present invention is based on the object of providing a heating device, which comprises two preceding arcuate hot plates, of a two-sided machine, which heating device is designed to solve the problems of the prior art whereby the length of the heating device of a two-sided machine is large, the production speed is low and the productivity is unsatisfactory.

According to the invention, the heating device, which comprises two preceding arcuate hot plates, of a two-sided machine has a stand, wherein, in the stand, there is arranged a first arcuate hot plate with a first heat-conducting plate element which has an arcuate shape in cross section and in which a heating means or heating medium is provided. The stand has a wall on which a sleeve is provided. A second arcuate hot plate is arranged above the first arcuate hot plate and comprises a second heat-conducting plate element which has an arcuate shape in cross section and in which a heating means or heating medium is provided. The middle or leading end of the second arcuate hot plate is connected to the sleeve by means of a connecting stem, wherein a rotary pair is formed between the second arcuate hot plate and the sleeve. In the stand, there is arranged a cylinder unit, the piston rod of which is connected to the trailing end of the second arcuate hot plate by means of a connecting rod.

The hot plates form a heating device of a type which involves contact. Corrugated-cardboard plies to be heated are, during operation of the heating device, in direct contact or direct heat-conducting connection with said heating device, wherein, in particular, the glue for connecting the corrugated-cardboard plies to one another is duly heated, but remains unimpaired, or is not adversely affected. During operation of the heating device, the corrugated-cardboard plies slide along the hot plates at least in regions and, in the process, are heated.

The two-sided machine is in particular in the form of a heating and traction unit. It expediently has at least one pressing element and at least one table arranged adjacent to said pressing element. Between the at least one pressing element and the at least one table, there is formed a pressing gap through which the corrugated-cardboard plies are guided and, there, are firmly connected to one another in layered fashion so as to form a multiply corrugated cardboard. There, an upstream adhesive-bonding point is present at which the corrugated-cardboard plies are pressed together, in particular for the first time. The at least one pressing element is preferably an encircling pressing belt for pressing the corrugated-cardboard plies against one another in the pressing gap.

It is possible for one or more second hot plates to be provided. This is in particular dependent on the number of plies of the finished corrugated cardboard. The second hot plates are then expediently arranged at different heights, such that, for example, an upper second and a lower second and possibly a middle second hot plate are provided.

The heating device may accordingly altogether comprise more than two hot plates. The numerical values specified in particular in the claims and in the description with regard to the hot plates are consequently minimal or minimum values.

The expressions "middle", "leading", "trailing", "upstream" and "downstream" or the like used in particular in conjunction with the second hot plate relate in particular to the conveying direction of the corrugated-cardboard plies, in particular to the conveying direction of the second corrugated-cardboard ply(s).

The first and/or the at least one second hot plate is hot, or heated, during the operation of the heating device. As heating means, use is expediently made of a fluid, in particular steam. Alternatively, use is made, for example, of electric heating.

The first and/or second hot plate expediently has a circular-arc shape, or substantially a circular-arc shape, in cross section. Other arcuate shapes are possible. It is expedient if the first and/or second hot plate is manufactured in each case from one piece.

The sleeve provided on the wall is to be understood in particular to mean a part which at least regionally encloses a space or object. The sleeve may have any desired contour, such as a circular-ring-shaped or polygonal contour. The sleeve is designed as a bearer which is formed for example as an angle bracket, beam or the like. It is expedient for each second hot plate to be assigned a sleeve.

The wall is formed for example by a surface, a plate element or the like. It may be planar or non-planar.

The stand is for example formed in the manner of a beam or frame.

The connecting stem is for example formed as a connecting shaft.

The cylinder unit expediently comprises a cylinder, a piston which is guided displaceably in the cylinder, and a piston rod which is fixedly connected to the piston. The cylinder unit preferably also has a connecting rod, which is then connected in particular fixedly to the piston rod. The piston rod preferably projects out of the cylinder. For example, the connecting rod and the piston rod are integrally connected to one another. The cylinder unit is actuable or adjustable. It operates preferably pneumatically or hydraulically. Alternatively, an electrical actuation unit is provided. It is expedient for each second hot plate to be assigned a cylinder unit.

By contrast to the invention, it is the case in the prior art that the distance between a preheating device and the two-sided machine is extremely long, giving rise to a not inconsiderable temperature loss of the corrugated-cardboard plies, which have been heated in the preheating device, in said free run before they reach the two-sided machine.

The first heat-conducting plate element and the second heat-conducting plate element are provided at a paper inlet of the two-sided machine. Via the paper inlet, the corrugated-cardboard plies pass into the two-sided machine for the purposes of generating the corrugated cardboard, which has at least three plies.

The corrugated cardboard expediently comprises a first corrugated-cardboard ply, a second corrugated-cardboard ply and a third corrugated-cardboard ply. The corrugated-cardboard plies are expediently in endless or web form. The same applies to the finished corrugated cardboard.

The first corrugated-cardboard ply is expediently formed by a smooth laminating ply The second corrugated-cardboard ply expediently comprises a smooth second surface ply and a second corrugated ply, which are connected to one another in layered fashion by means of a glue layer.

The third corrugated-cardboard ply expediently comprises a smooth third surface ply and a third corrugated ply, which are connected to one another in layered fashion by means of a glue layer.

Alternatively, instead of a five-ply corrugated cardboard, it is for example the case that a three-ply or seven-ply corrugated cardboard is formed in the two-sided machine.

Furthermore, each of the first heat-conducting plate element and second heat-conducting plate element is equipped with two or more heating lines which are spaced apart along the direction of extent of the arc, wherein the axial direction of each heating line is parallel to the longitudinal direction of the first heat-conducting plate element and of the second heat-conductive plate element, and the heating lines contain a heating medium.

Furthermore, the sleeve is connected to the wall by means of screws which extend through slots provided in the sleeve.

Furthermore, a fine adjustment means for the manual adjustment of the position of the sleeve is arranged below the sleeve and is provided in the stand.

The functional principle of the present invention is as follows: the first arcuate hot plate and the second arcuate hot plate are provided at the paper inlet end of the two-sided machine; a second corrugated-cardboard ply and a first corrugated-cardboard ply are guided so as to run between the second arcuate hot plate and the first arcuate hot plate, whereas a third corrugated-cardboard ply is guided so as to run above the second arcuate hot plate.

When the two-sided machine is operating correctly, the second arcuate hot plate is lowered using the cylinder unit in order to be placed in connection with the second corrugated-cardboard ply, wherein the heat within the second arcuate hot plate is rapidly transmitted to the second corrugated-cardboard ply and is simultaneously transmitted to the glue on the underside of the third corrugated-cardboard ply, whereas the heat within the first arcuate hot plate is transmitted to the glue under the second corrugated-cardboard ply via the first corrugated-cardboard ply, such that the glue can reach a temperature such that it is possible to achieve optimum bonding capability prior to the bonding of the first corrugated-cardboard ply, the second corrugated-cardboard ply and the third corrugated-cardboard ply, wherein a multi-ply corrugated cardboard with high quality is output if the first corrugated-cardboard ply, the second corrugated-cardboard ply and the third corrugated-cardboard ply are connected correctly.

The degree of bonding between the second arcuate hot plate and the second corrugated-cardboard ply can be finely adjusted using the fine adjustment means, provided below the sleeve, for the manual adjustment of the position of the sleeve, in order to ensure that the second corrugated-cardboard ply can receive the maximum amount of heat.

In the case of the production of lightweight cardboard, or in the event of a malfunction of the two-sided machine, the second arcuate hot plate is rapidly removed from the surface of the second corrugated-cardboard pl by means of the connecting rod of the cylinder unit, in order to prevent excessive amounts of heat from adversely affecting the bonding capability of the glue.

Compared with the prior art, the technical effect of the present invention is positive and significant. According to the invention, two arcuate hot plates, that is to say an upper and a lower hot plate, are provided at the paper inlet end of the two-sided machine; a second corrugated-cardboard ply and a first corrugated-cardboard ply are guided so as to run between the second arcuate hot plate and the first arcuate hot plate, whereas a third corrugated-cardboard ply is guided so as to run above the second arcuate hot plate; the second arcuate hot plate is lowered using the cylinder unit in order to be placed in connection with the second corrugated-cardboard ply, such that the glue can reach a temperature such that it is possible to achieve optimum bonding capability prior to the bonding of the first corrugated-cardboard ply, the second corrugated-cardboard ply and the third corrugated-cardboard ply, whereby a multi-layer corrugated cardboard with high quality, using the first corrugated-cardboard ply, the second corrugated-cardboard ply and the third corrugated-cardboard ply, is output at the paper outlet end of the two-sided machine. The production speed and productivity are thus improved, and the heating means inherent in the two-sided machine are reduced in number, such that the overall arrangement is simplified.

By means of the arrangement of the hot plates arranged directly adjacent to an upstream adhesive-bonding point of the two-sided machine, the free unheated length of the corrugated-cardboard plies, which have been heated by the in particular at least one second hot plate(s), as far as the initial adhesive-bonding point of the two-sided machine is extremely short, such that substantially no temperature losses occur in the corrugated-cardboard ply/plies along said unheated length.

The spacing x of the hot plates along the corrugated-cardboard plies to the initial adhesive-bonding point may be identical or different, the spacing being such that 10 cm×100 cm. In particular, the second hot plate has the stated spacing.

It is expedient for the saturated-steam temperature of the at least one corrugated-cardboard saturated-steam-generating device for applying saturated steam to a corrugated-cardboard ply to be adjustable, wherein the at least one corrugated-cardboard saturated-steam-generating device expediently wets the respective second hot plate with water for the purposes of evaporating said water. The saturated-steam flow rate of the at least one corrugated-cardboard saturated-steam-generating device is preferably adjustable. It is expedient if a wetting width of the at least one corrugated-cardboard saturated-steam-generating device is adjustable. The at least one corrugated-cardboard saturated-steam-generating device is for example arranged directly at the respective second hot plate, preferably at the upstream end thereof. Alternatively, said at least one corrugated-cardboard saturated-steam-generating device is arranged upstream of and adjacent to the respective second hot plate, and is expediently displaceable in height relative to said second hot plate. The at least one corrugated-cardboard saturated-steam-generating device is expediently capable of applying steam directly or indirectly to the respective corrugated-cardboard ply.

The steam/water temperature of the at least one corrugated-cardboard steam/water-spraying device of the heating device, the steam/water-spraying device preferably being arranged upstream, is expediently adjustable. The steam/water flow rate of the at least one corrugated-cardboard steam/water-spraying device is preferably adjustable. It is expedient for a wetting width of the at least one corrugated-cardboard steam/water-spraying device to be adjustable.

It is advantageous if each corrugated-cardboard steam/water-spraying device is arranged downstream of the corrugated-cardboard saturated-steam-generating device of the corresponding corrugated-cardboard ply. It is advantageous if the corrugated-cardboard steam/water-spraying device and the corrugated-cardboard saturated-steam-generating device of the respective corrugated-cardboard ply are arranged adjacent to one another.

In an alternative embodiment, no corrugated-cardboard saturated-steam-generating device is provided. In an alternative embodiment, no corrugated-cardboard steam/water-spraying device is provided. Alternatively, a combined corrugated-cardboard saturated-steam steam/water-generating/spraying device is provided.

The present invention is furthermore based on the object of providing a two-sided machine which is designed to solve the problems of the prior art whereby the length of the heating device of a two-sided machine is large, the production speed is low and the productivity is unsatisfactory.

Said object is achieved according to the invention by a two-sided machine having at least one table, at least one pressing element which is arranged adjacent to the table, a pressing gap, which is present between the at least one table and the at least one pressing element, for the leadthrough of corrugated-cardboard plies with the formation of corrugated cardboard, and a heating device according to the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Embodiment 1

Figure 1:
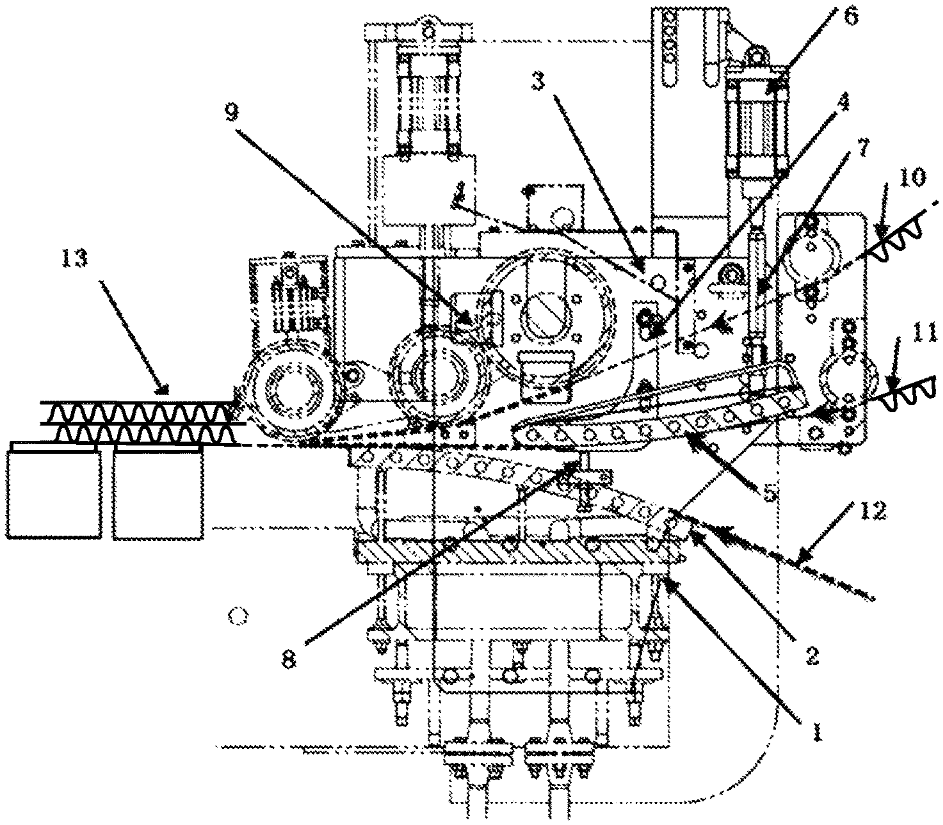
FIG. 1 is a schematic view of the heating device, which comprises two preceding arcuate hot plates, of a two-sided machine according to the present invention.
Figure 2:
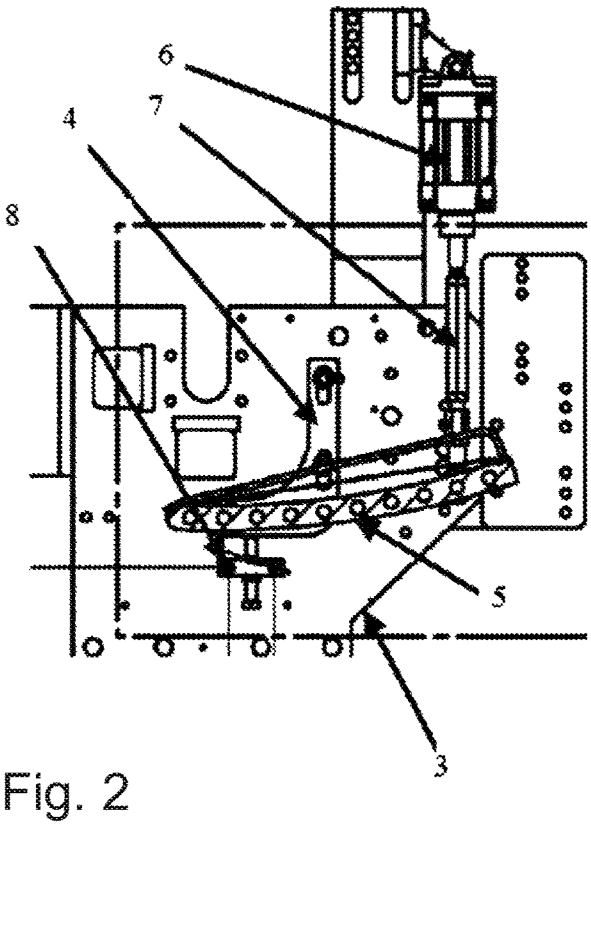
FIG. 2 is a schematic view of the second arcuate hot plate in the heating device, which comprises two preceding arcuate hot plates, of a two-sided machine according to the present invention.

Referring to FIGS. 1 and 2, the heating device, which comprises two preceding arcuate hot plates, of a two-sided machine according to the present invention comprises a stand 1 in which there is arranged a first arcuate hot plate 2 which comprises a first heat-conducting plate element with an arcuate cross section, wherein a heating means is situated in the first heat-conducting plate element. In the stand 1 there is arranged a wall 3 on which a sleeve 4 is provided. A second arcuate hot plate 5 is provided above the first arcuate hot plate 2 and comprises a second heat-conducting plate element with an arcuate cross section, wherein a heating means is situated in the second heat-conductive plate element.

The middle or leading end of the second arcuate hot plate 5 is connected to the sleeve 4 by means of a connecting stem, wherein a rotary pair is formed between the second arcuate hot plate 5 and the sleeve 4. In the stand 1 there is arranged a cylinder unit 6, the piston rod of which is connected to the trailing end of the second arcuate hot plate 5 by means of the connecting rod 7.

Furthermore, the first heat-conducting plate element is provided at the paper inlet of the two-sided machine.

Furthermore, in each of the first heat-conducting plate element and second heat-conducting plate element, there are provided two or more heating lines which are spaced apart along the direction of extent of the arc, wherein the axial direction of each heating line is parallel to the longitudinal direction of the first heat-conducting plate element and of the second heat-conducting plate element, and the heating lines contain a heating medium.

Furthermore, the sleeve 4 is connected to the wall 3 by means of screws which extend through slots provided in the sleeve 4.

Furthermore, a fine adjustment means 8 for the manual adjustment of the position of the sleeve 4, which is arranged in the stand 1, is arranged below the sleeve 4.

The functional principle of the present invention is as follows: the first arcuate hot plate 2 and the second arcuate hot plate 5 are provided at the paper inlet end of the two-sided machine 9; a second corrugated-cardboard ply 11 and a first corrugated-cardboard ply 12 are guided so as to run between the second arcuate hot plate 5 and the first arcuate hot plate 2, whereas a third corrugated-cardboard ply 10 is guided so as to run above the second arcuate hot plate 5. When the two-sided machine 9 is operating correctly, the second arcuate hot plate 5 is lowered using the cylinder unit 6 in order to be placed in connection with the second corrugated-cardboard ply 11, wherein the heat within the second arcuate hot plate 5 is rapidly transmitted to the second corrugated-cardboard ply 11 and is simultaneously transmitted to the glue on the underside of the third corrugated-cardboard ply 10, whereas the heat within the first arcuate hot plate 2 is transmitted to the glue under the second corrugated-cardboard ply 11 via the first corrugated-cardboard ply 12, such that, prior to the bonding of the third corrugated-cardboard ply 10, the second corrugated-cardboard ply 11 and the first corrugated-cardboard ply 12, the glue can reach a temperature such that it is possible to achieve optimum bonding capability, and a multi-ply corrugated cardboard 13 with high quality is output if the third corrugated-cardboard ply 10, the second corrugated-cardboard ply 11 and the first corrugated-cardboard ply 12 are connected correctly.

The degree of bonding between the second arcuate hot plate 5 and the second corrugated-cardboard ply 11 can be finely adjusted using the fine adjustment means 9, provided below the sleeve 4, for the manual adjustment of the position of the sleeve 4, in order to ensure that the second corrugated-cardboard ply 11 can receive the maximum amount of heat.

In the case of the production of lightweight cardboard, or in the event of a malfunction of the two-sided machine 9, the second arcuate hot plate 5 is rapidly removed from the surface of the second corrugated-cardboard ply 11 by means of the connecting rod 7 of the cylinder unit 6, in order to prevent excessive amounts of heat from adversely affecting the bonding capability of the glue.

Embodiment 2

Below, with reference in particular to FIGS. 3 to 9, a second embodiment of the invention will be described. Identical parts or components are denoted by the same reference designations as in the previous embodiment, to the description of which reference is hereby made. Parts or components which differ in terms of construction but which are functionally identical are denoted by the same reference designations with the suffix "a".

Figure 3:
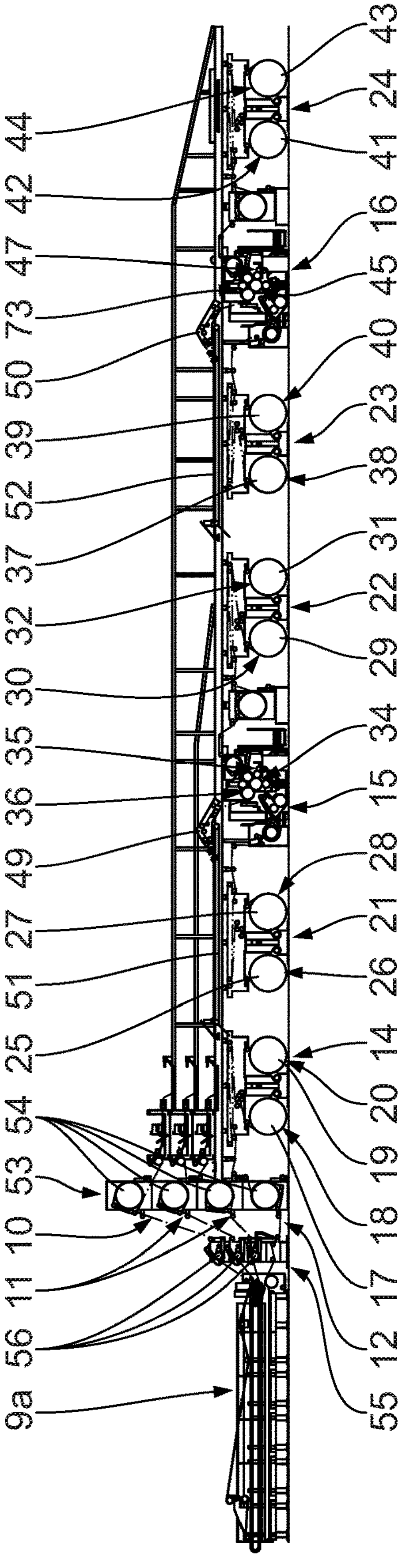
FIG. 3 is a schematic partial view of a corrugated-cardboard production line which comprises a two-sided machine according to the invention as per a second embodiment.
Figure 4:
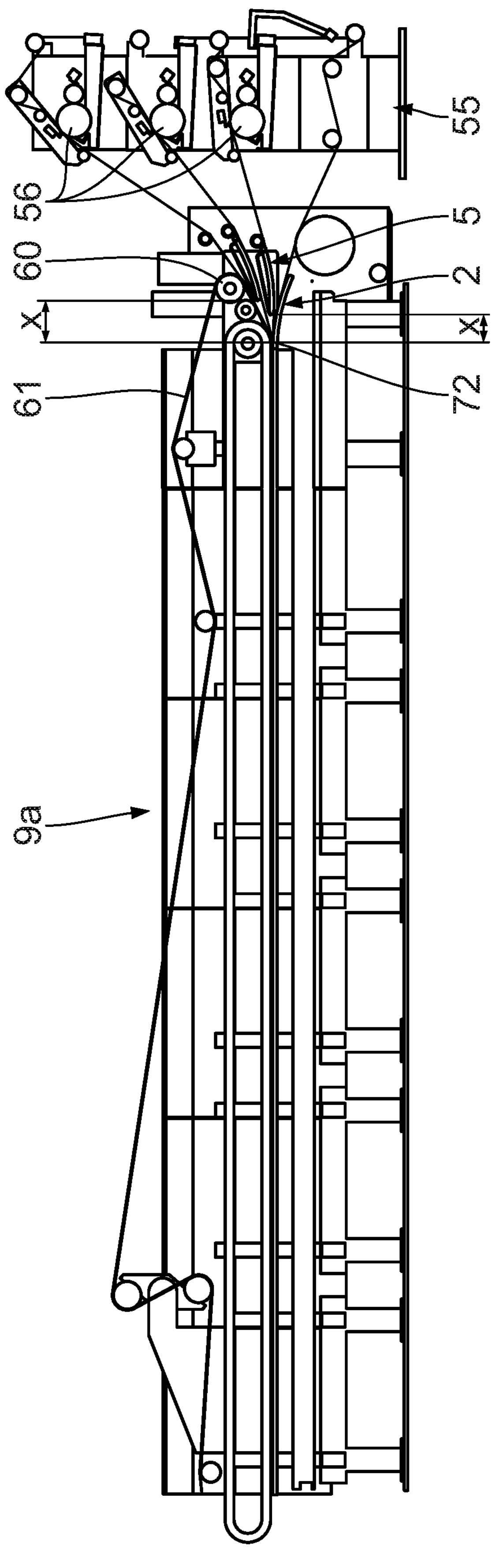
FIG. 4 is a view of the two-sided machine shown in FIG. 3, and an adjacent gluing device, on a greatly enlarged scale.
Figure 5:
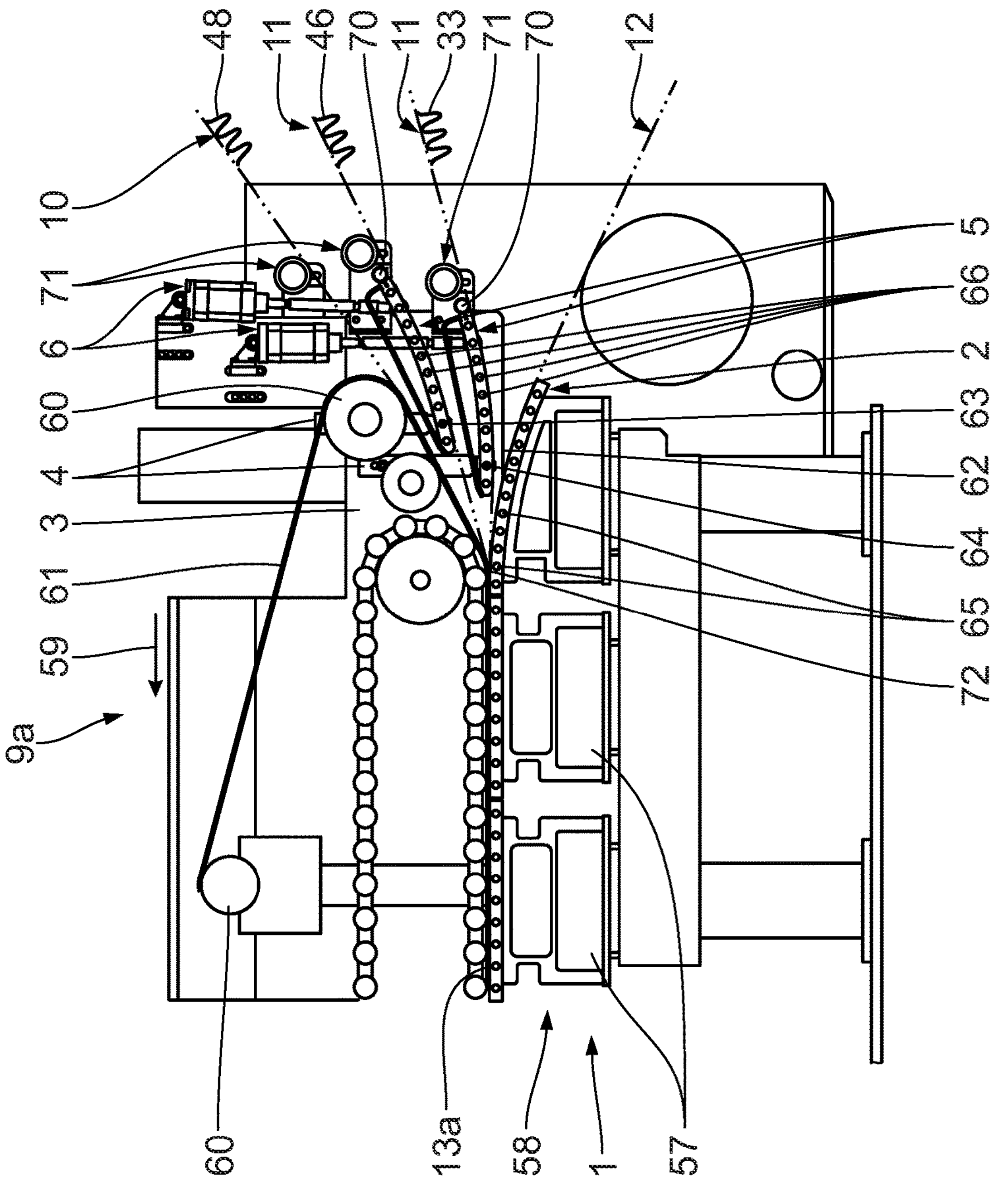
FIG. 5 is an enlarged view of the paper inlet end of the two-sided machine shown in FIGS. 3 and 4, on a greatly enlarged scale.
Figure 6:
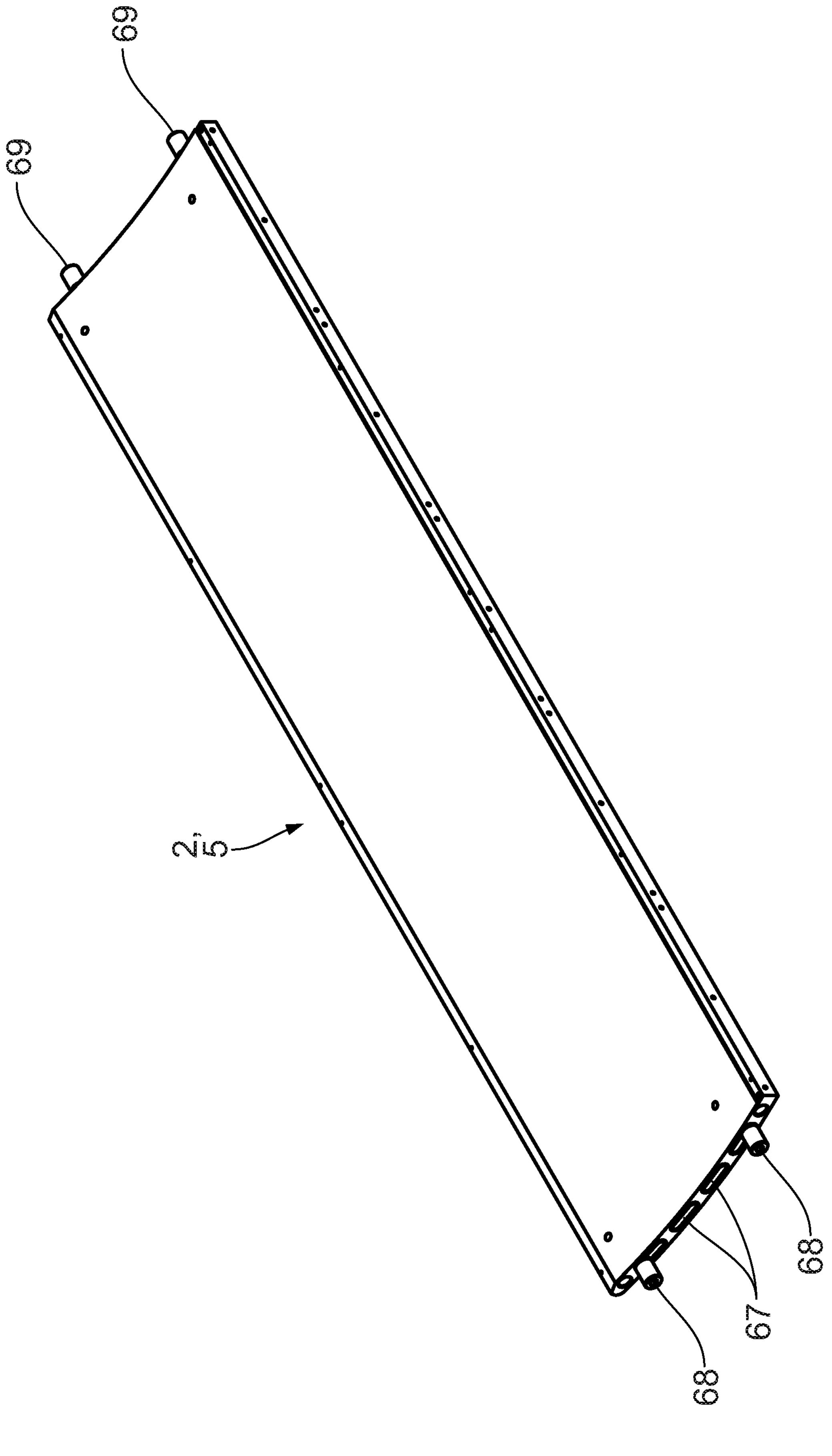
FIG. 6 is a view of a hot plate in the assembled state of the two-sided machine illustrated in FIGS. 3 to 5.
Figure 7:
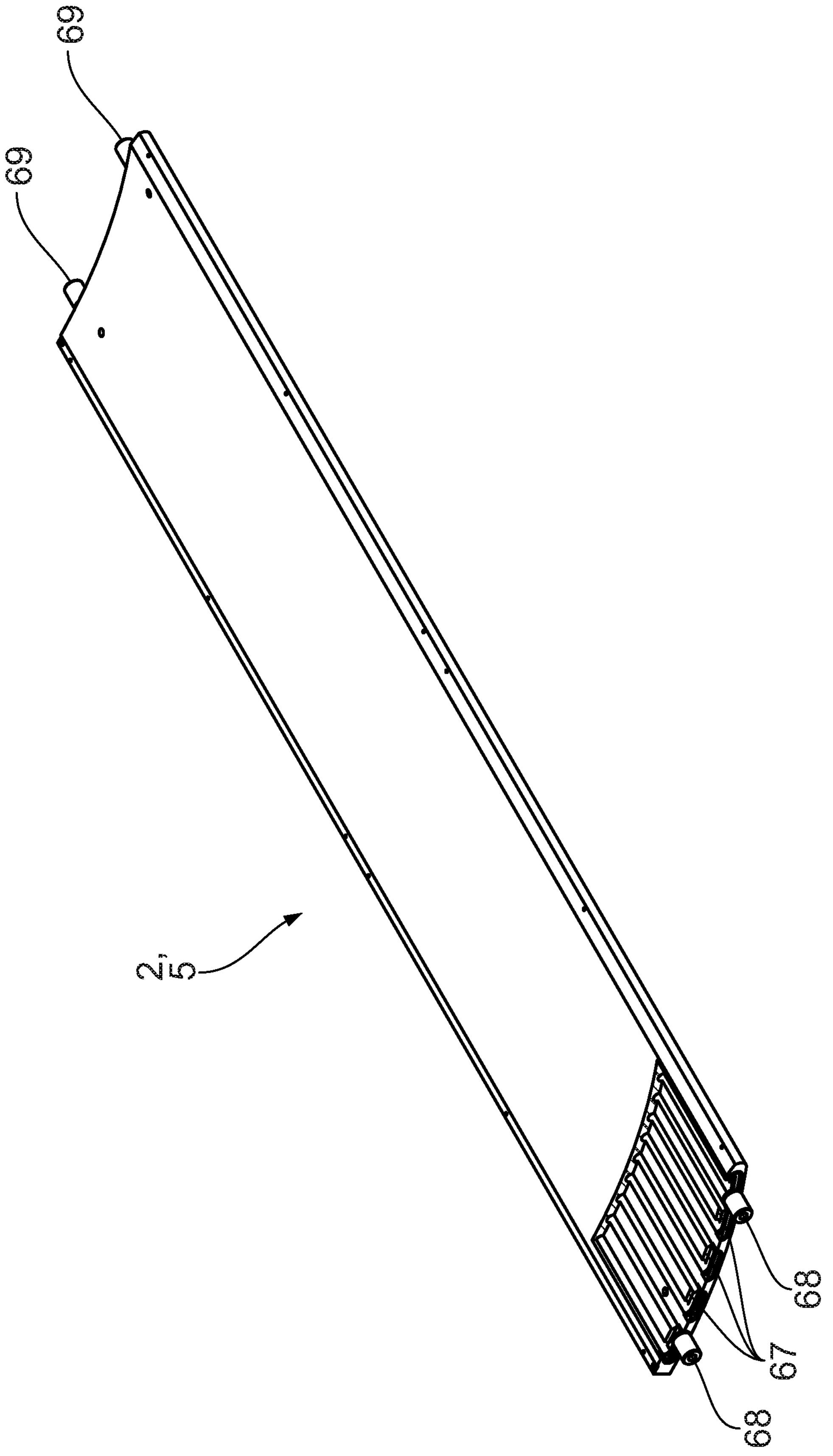
FIG. 7 is a view of the hot plate illustrated in FIG. 6, with an end plate removed.
Figure 8:
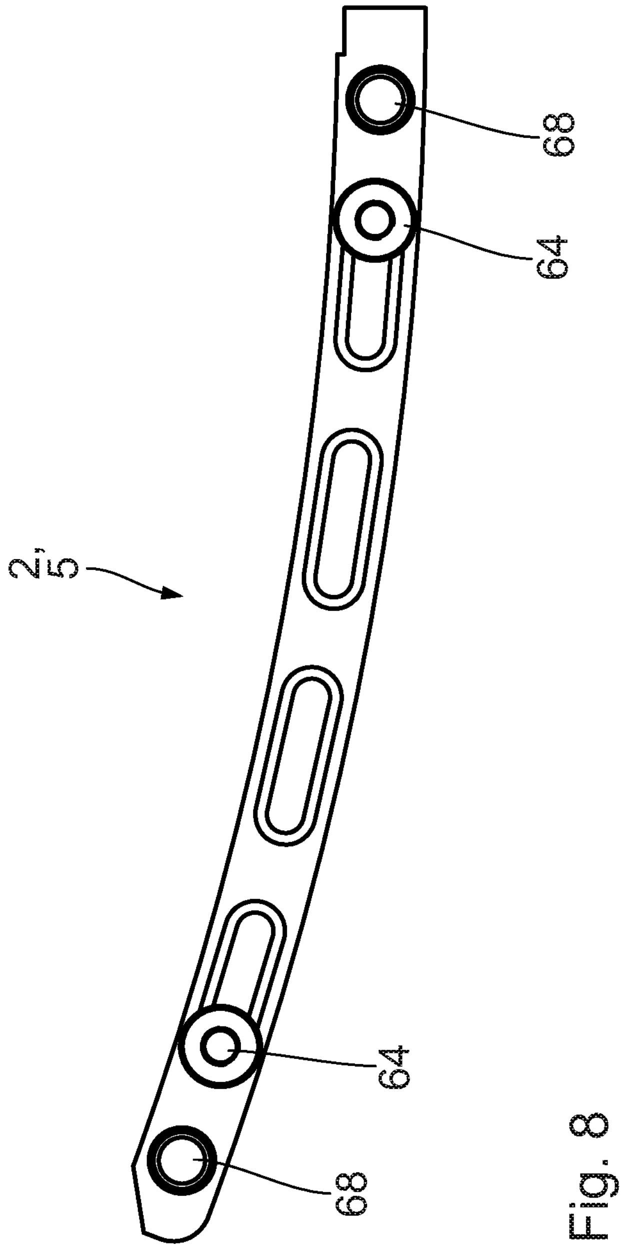
FIG. 8 is a front view of the hot plate illustrated in FIGS. 6 and 7.
Figure 9:
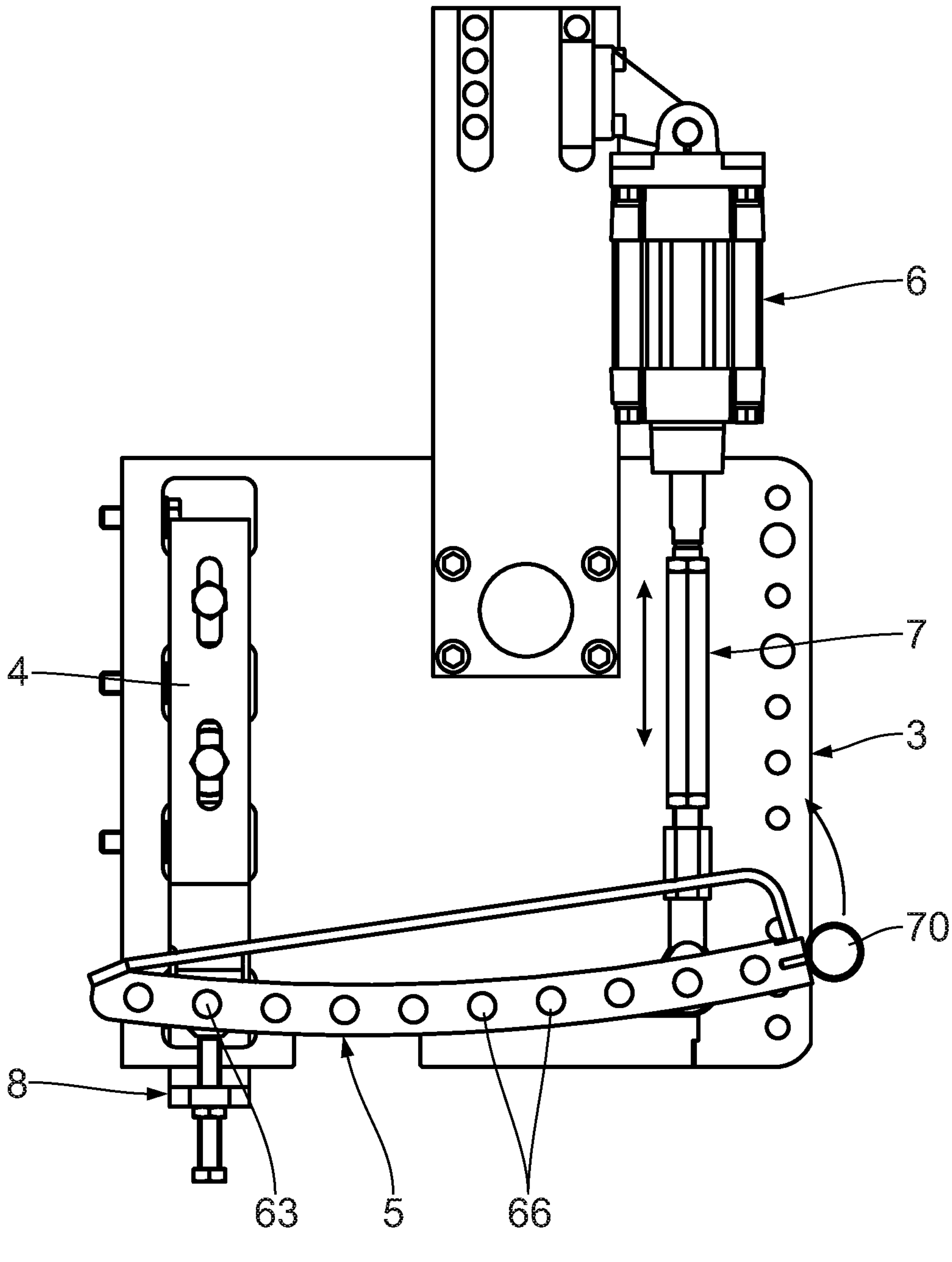
FIG. 9 is a view of an enlarged part of the heating device shown in FIGS. 4 and 5.

A corrugated-cardboard production line as is partially illustrated in FIG. 3 serves for the production of a seven-ply corrugated cardboard 13*a* with a first corrugated-cardboard ply 12 and two second corrugated-cardboard plies 11 and with a third corrugated-cardboard ply 10. The second corrugated-cardboard plies 11 are of identical design. The second and third corrugated-cardboard plies 11, 10 are each of two-ply configuration, whereas the first corrugated-cardboard ply 12 is of single-ply configuration.

To produce the first corrugated-cardboard ply 12, the corrugated-cardboard production line has a first splicing device 14. To produce the two second corrugated-cardboard plies 11, the corrugated-cardboard production line has two second corrugated-cardboard production devices 15, 16, which are in each case of identical form. To produce the third corrugated-cardboard ply 10, the corrugated-cardboard production line has a third corrugated-cardboard production device (not illustrated), which is identical to the second corrugated-cardboard production devices 15, 16.

The first splicing device 14 comprises a first unrolling unit 18 for the unrolling of a finite first material ply from a first material roll 17 and comprises a second unrolling unit 20 for the unrolling of a finite second material ply from a second material roll 19. The finite first and second material plies are connected to one another, so as to provide the endless first corrugated-cardboard ply 12, by means of a connecting and cutting unit (not illustrated) of the first splicing device 14.

A second splicing device 21 and a third splicing device 22 are positioned so as to precede one second corrugated-cardboard production device 15. A fourth splicing device 23 and a fifth splicing device 24 are positioned so as to precede the other second corrugated-cardboard production device 16. A sixth splicing device (not illustrated) and a seventh splicing device (not illustrated) are positioned so as to precede the third corrugated-cardboard production device. The splicing devices are expediently of identical design.

The second splicing device 21 comprises a third unrolling unit 26 for the unrolling of a finite third material ply from a third material roll 25 and comprises a fourth unrolling unit 28 for the unrolling of a finite fourth material ply from a fourth material roll 27. The finite third and fourth material plies are connected to one another, so as to provide an endless first material ply, by means of a connecting and cutting unit (not illustrated) of the second splicing device 21.

The third splicing device 22 comprises a fifth unrolling unit 30 for the unrolling of a finite fifth material ply from a fifth material roll 29 and comprises a sixth unrolling unit 32 the unrolling of a finite sixth material ply from a sixth material roll 31. The finite fifth and sixth material plies are connected to one another, so as to provide an endless second material ply, by means of a connecting and cutting unit (not illustrated) of the third splicing device 22.

The endless first material ply is fed via at least one diverting roller, and the endless second material ply is fed via at least one diverting roller, to the corrugated-cardboard production device 15.

To produce an endless corrugated ply 33, which has a corrugation, from the endless first material ply, the corrugated-cardboard production device 15 comprises a corrugated roll arrangement 34 with two rotatably mounted corrugated rolls. The corrugated rolls form a roll gap for leading through, and imparting a corrugation to, the endless first material ply.

For the glued connection of the corrugated ply 33 to the endless second material ply to form the unilaterally laminated second corrugated-cardboard ply 11, the corrugated-cardboard production device 15 comprises a gluing assembly 35, which in turn comprises a glue-dosing roll, a glue container and a glue-applying roll. For the leadthrough and application of glue to the corrugated ply 33, the glue-applying roll forms a gluing gap with the lower corrugated roll, wherein the glue-applying roll applies glue from the glue container to tips of the corrugation of the endless corrugated ply 33. The endless second material ply is subsequently joined together, in the corrugated-cardboard production device 15, with the corrugated ply 33 that has been provided with glue, such that the unilaterally laminated second corrugated-cardboard ply 11 is formed.

For the pressing of the endless second material ply against the corrugated ply 33 that has been provided with glue, the corrugated-cardboard production device 15 has a pressing device 36. The pressing device 36 is expediently designed as a pressing belt module. It presses against the endless second material ply, which in turn is pressed against the corrugated ply 33 that has been provided with glue, said corrugated ply bearing against the upper corrugated roll.

The fourth splicing device 23 comprises a seventh unrolling unit 38 for the unrolling of a finite seventh material ply from a seventh material roll 37 and comprises an eighth unrolling unit 40 the unrolling of a finite eighth material ply from an eighth material roll 39. The finite seventh and eighth material plies are connected to one another, so as to provide an endless third material ply, by means of a connecting and cutting unit (not illustrated) of the fourth splicing device 23.

The fifth splicing device 24 comprises a ninth unrolling unit 42 for the unrolling of a finite ninth material ply from a ninth material roll 41 and comprises a tenth unrolling unit

44 for the unrolling of a finite tenth material ply from a tenth material roll 43. The finite ninth and tenth material plies are connected to one another, so as to provide an endless fourth material ply, by means of a connecting and cutting unit (not illustrated) of the fifth splicing device 24.

To produce an endless corrugated ply 46, which has a corrugation, from the endless third material ply, the corrugated-cardboard production device 16 comprises a corrugated roll arrangement 45 with two corrugated rolls. The corrugated rolls form a roll gap for leading through, and imparting a corrugation to, the endless third material ply.

For the glued connection of the endless corrugated ply 46 to the endless fourth material ply to form the further unilaterally laminated endless second corrugated-cardboard ply 11, the corrugated-cardboard production device 16 comprises a gluing assembly 47, which in turn comprises a glue-dosing roll, a glue container and a glue-applying roll. For the leadthrough and application of glue to the corrugated ply 46, the glue-applying roll forms a gluing gap with the upper corrugated roll, wherein the glue-applying roll transfers glue from the glue container to tips of the corrugation of the corrugated ply 46.

The endless fourth material ply is subsequently joined together, in the corrugated-cardboard production device 16, with the endless corrugated ply 46 that has been provided with glue from the glue container, such that the further unilaterally laminated endless second corrugated-cardboard ply 11 is formed.

For the pressing of the endless fourth material ply against the corrugated ply 46 that has been provided with glue, said corrugated ply in turn bearing in regions against the upper corrugated roll, the corrugated-cardboard production device 16 has a pressing device 73. The pressing device 73 is expediently designed as a pressing belt module. It presses against the endless fourth material ply, which in turn is pressed against the corrugated ply 46 that has been provided with glue, said corrugated ply bearing against the upper corrugated roll.

The sixth splicing device comprises an eleventh unrolling unit for the unrolling of a finite eleventh material ply from an eleventh material roll and comprises a twelfth unrolling unit for the unrolling of a finite twelfth material ply from a twelfth material roll. The finite eleventh and twelfth material plies are connected to one another, so as to provide an endless fifth material ply, by means of a connecting and cutting unit (not illustrated) of the sixth splicing device.

The seventh splicing device comprises a thirteenth unrolling unit for the unrolling of a finite thirteenth material ply from a thirteenth material roll and comprises a fourteenth unrolling unit the unrolling of a finite fourteenth material ply from a fourteenth material roll. The finite thirteenth and fourteenth material plies are connected to one another, so as to provide an endless sixth material ply, by means of a connecting and cutting unit (not illustrated) of the seventh splicing device.

The endless first material ply is fed via at least one diverting roller, and the endless sixth material ply is fed via at least one diverting roller, to the third corrugated-cardboard production device.

To produce a corrugated ply 48, which has a corrugation, from the endless fifth material ply, the third corrugated-cardboard production device comprises a corrugated roll arrangement with two corrugated rolls arranged adjacent to one another. Said corrugated rolls form a roll gap for leading through, and imparting a corrugation to, the endless material ply.

For the glued connection of the endless corrugated ply 48 to the endless sixth material ply to form the unilaterally laminated third corrugated-cardboard ply 10, the third corrugated-cardboard production device comprises a gluing assembly, which in turn comprises a glue-dosing roll, a glue container and a glue-applying roll. For the leadthrough and application of glue to the endless corrugated ply 48, the glue-applying roll forms a gluing gap with the upper corrugated roll, wherein the glue-applying roll transfers glue from the glue container to tips of the corrugation of the endless corrugated ply 48.

The endless sixth material ply is subsequently joined together, in the third corrugated-cardboard production device, with the endless corrugated ply 48 that has been provided with glue from the glue container, such that the unilaterally laminated endless third corrugated-cardboard ply 10 is formed.

For the pressing of the endless sixth material ply against the corrugated ply 48 that has been provided with glue, said corrugated ply in turn bearing in regions against the upper corrugated roll, the third corrugated-cardboard production device has a pressing device. The pressing device is expediently designed as a pressing belt module. It presses against the endless sixth material ply, which in turn is pressed against the corrugated ply 48 that has been provided with glue, said corrugated ply bearing against the upper corrugated roll.

For the intermediate storage and buffering of one second corrugated-cardboard ply 11, the latter is fed by means of an upward transport device 49 to an intermediate storage device 51, where said corrugated-cardboard ply, when stored in an adequate amount, forms loops.

For the intermediate storage and buffering of the further second corrugated-cardboard ply 11, the latter is fed by means of a further upward transport device 50 to a further intermediate storage device 52, where said corrugated-cardboard ply, when stored in an adequate amount, forms loops.

For the intermediate storage and buffering of the third corrugated-cardboard ply 10, the latter is fed by means of an upward transport device to a third intermediate storage device, where said corrugated-cardboard ply, when stored in an adequate amount, forms loops.

Downstream of the intermediate storage devices 51, 52 there is situated a preheating device 53 of the corrugated-cardboard production line, which preheating device comprises four heating rolls 54 arranged one above the other. The corrugated-cardboard plies 10, 11, 12 are fed to the preheating device 53, and are partially looped around the respective heating roll 54, whereby, during operation, the corrugated-cardboard plies 10, 11, 12 are preheated or warmed.

Downstream of the preheating device 53, the corrugated-cardboard production line has a gluing apparatus 55 with three gluing rolls 56 arranged one above the other, which gluing rolls are partially immersed in a respective glue bath. The second and third, preheated corrugated-cardboard plies 11, 10 are in contact with the respective gluing roll 56.

Downstream of the gluing apparatus 55, the corrugated-cardboard production line has the two-sided machine 9*a*, which is designed as a heating and pressing apparatus. In the two-sided machine 9*a*, the corrugated-cardboard plies 10, 11 that have been provided with glue, and the first corrugated-cardboard ply 12, are heated further and are pressed against one another. For this purpose, the two-sided machine 9*a* has a horizontal table 58 which is equipped with heating elements 57 and which extends in a locally prevailing transport direction 59 of the corrugated-cardboard plies 12, 11, 10.

Above the table 58, the two-sided machine 9*a* has an endless pressing belt 61 which is guided around diverting rolls 60. Between the pressing belt 61 and the table 58 there is formed a pressing gap 62 through which the corrugated-cardboard plies 12, 11, 10 are transported, with the corrugated-cardboard plies being pressed against one another there. In the pressing gap 62, the two-sided machine 9*a* has an adhesive-bonding point 72, which is the initial or upstream starting point of the corrugated-cardboard ply pressing path in the two-sided machine 9*a*. The hot plates 2, 5 are arranged upstream and adjacent to the adhesive-bonding point 72 and have in each case a spacing x of between 10 cm and 100 cm to said adhesive-bonding point. The multi-ply corrugated cardboard 13*a* is formed in the two-sided machine 9*a*.

The heating elements 57 are preferably a constituent part of the heating device. The two-sided machine 9*a* has the hot plates 2, 5 at its upstream paper inlet end.

The first corrugated-cardboard ply 12 is again guided on the first arcuate hot plate 2 of the heating device. Above the first hot plate 2, two second hot plates 5 are arranged at different heights. There is thus a lower and an upper second hot plate 5. Each second hot plate 5 guides a second corrugated-cardboard ply 11. Above the two second hot plates 5, the third corrugated-cardboard ply 10 runs into the second two-sided machine 9*a*.

The two second arcuate hot plates 5 are of identical form and have in each case one second heat-conducting plate element with an arcuate cross section, wherein a heating medium is situated in each second plate element. The second hot plates 5 are curved in/along the transport direction 59, in particular in the same orientation. They are curved in the opposite orientation to the first hot plate 2, which is also curved in/along the transport direction 59.

The middle or leading end of the second arcuate hot plate 5 in relation to the transport direction 59 of the corrugated-cardboard plies 12, 11, 10 is connected in each case to a bearer-like sleeve 4 by means of a connecting stem. The leading end of the second hot plates 5 is the downstream end thereof.

The trailing or upstream ends of the second hot plates 5 are in each case connected to a cylinder unit 6. The cylinder units 6 extend vertically. The piston rods or connecting rods can be deployed out of the cylinder and retracted into the cylinder again. Through actuation of the cylinder units 6 or of the piston rods or connecting rods 7 thereof, the second hot plates 5 can be pivoted about a respective horizontal pivot spindle 63 or 64 at the respective sleeve 4.

Each second hot plate 5 has a downwardly directed guide surface for the respective second corrugated-cardboard ply 11, whereas the first hot plate 2 has an upwardly facing guide surface for the first corrugated-cardboard ply 12. The guide surfaces of the second hot plates 5 are in this case convexly curved. The curvature may change along the transport direction 59. Here, the second corrugated-cardboard plies 11 lie slidingly on the guide surfaces of the second hot plates 5 during operation, whereas the first corrugated-cardboard ply 12 lies slidingly on the guide surface of the first hot plate 2.

The heating device, which comprises three preceding arcuate hot plates 2, 5, of a two-sided machine has a stand 1, wherein, in the stand 1, there is arranged a first arcuate hot plate 2 with a first heat-conducting plate element which has an arcuate shape in cross section and in which a heating means or heating medium is provided. The stand 1 has a wall 3 on which two sleeves 4 are provided.

A lower second arcuate hot plate 5 is arranged adjacent to and above the first arcuate hot plate 2 and comprises a second heat-conducting plate element, which has an arcuate shape in cross section and in which a heating means or heating medium is provided. The middle or leading end of the lower second arcuate hot plate 5 is connected to the further associated sleeve 4 by means of a connecting stem, wherein a further rotary pair is formed between said second arcuate hot plate 5 and the sleeve 4.

In the stand 1, there is arranged a cylinder unit 6, the piston rod of which is connected to the trailing end of the second upper arcuate hot plate 5 by means of a connecting rod.

An upper second arcuate hot plate 5 is arranged adjacent to and above the lower second arcuate hot plate 5 and comprises a further second heat-conducting plate element which has an arcuate shape in cross section and in which a heating means or heating medium is provided. The middle or leading end of the upper second arcuate hot plate 5 is connected to the further associated sleeve 4 by means of a further connecting stem, wherein a further rotary pair is formed between said upper second arcuate hot plate 5 and the further associated sleeve 4.

In the stand 1, there is arranged a further cylinder unit 6, the piston rod of which is connected to the trailing end of the second upper arcuate hot plate 5 by means of a further connecting rod.

Each hot plate 2, 5 has multiple heating lines 65 and 66 which extend perpendicular to the transport direction 59. The heating lines 65 run parallel to and spaced apart from one another in the first hot plate 2. Also, the heating lines 66 extend parallel to and spaced apart from one another in the second hot plates 5. The heating lines 65, 66 may, in the respective hot plate 2 or 5, be connected in terms of flow to one another so as to form at least one respective, preferably meandering, heating duct. For this purpose, in each hot plate 2, 5, connecting lines 67 are provided between the heating lines 65 and 66, which connecting lines expediently run adjacent to side edges of the respective hot plate 2 or 5 and parallel to the transport direction 59. The hot plates 2, 5 are, in particular for manufacturing reasons, closed off by means of end plates in the region of the connecting lines 67.

Each hot plate 2 or 5 has at least one inlet 68 which is directly or indirectly connected in terms of flow to the corresponding heating lines 65 or 66. The heating medium passes via the at least one inlet 68 into the respective hot plate 2 or 5 for the purposes of heating the latter.

Each hot plate 2 or 5 has at least one outlet 69 which is directly or indirectly connected in terms of flow to the corresponding heating lines 65 or 66 and which is arranged substantially opposite the at least one inlet 68. The heating medium exits the respective heated hot plate 2 or 5 via the at least one outlet 69.

A saturated-steam-generating device 71 for generating saturated steam is provided upstream of and adjacent to each second hot plate 5. In particular, saturated steam is applied to the smooth material ply or surface ply of the respective adjacent second corrugated-cardboard ply 11. It is expedient for each saturated-steam-generating device 71 to be arranged at the adjacent second hot plate 5. Alternatively, the saturated-steam-generating device 71 is a constituent part of the adjacent second hot plate 5.

Upstream of and adjacent to each second hot plate 5, there is arranged a steam/water-spraying device 70 for spraying water and/or steam onto the smooth material ply or surface ply of the respective adjacent second corrugated-cardboard ply 11. Each steam/water-spraying device 70 is arranged between the second hot plate 5 and the adjacent saturated-steam-generating device 71. Each steam/water-spraying device 70 is expediently arranged at the adjacent second hot plate 5. Alternatively, each steam/water-spraying device 70 is a constituent part of the adjacent second hot plate 5.

Furthermore, a saturated-steam-generating device 71 is assigned to the third corrugated-cardboard ply 10 upstream of the pressing belt 61, so as to spray saturated steam onto the smooth material ply or surface ply thereof too.

It is advantageous if the second hot plates 5 have steam outlet openings (not illustrated) on their guide surfaces for the purposes of filling the second corrugated-cardboard ply 11 that is guided there, or the finished corrugated cardboard 13*a*, with steam.

The steam for heating the hot plates 2, 5 and the corrugated-cardboard plies 11, 12 may originate for example from the two-sided machine 9*a* itself or from separate steam-generating devices.

The functional principle of this embodiment is as follows: the first arcuate hot plate 2 and the second arcuate hot plates 5 are provided at the paper inlet end of the two-sided machine 9; a second corrugated-cardboard ply 11 and a first corrugated-cardboard ply 12 adjacent thereto are guided so as to run between the lower second arcuate hot plate 5 and the first arcuate hot plate 2, whereas another second corrugated-cardboard ply 12 is guided so as to run between the second hot plates 5, whereas a third corrugated-cardboard ply 10 is guided so as to run above the upper second arcuate hot plate 5.

When the two-sided machine 9 is operating correctly, the second arcuate hot plates 5 are lowered using the respective cylinder unit 6 in order to be placed in connection with the respective second corrugated-cardboard ply 11, wherein the heat within the second arcuate hot plate 5 is rapidly transmitted to the corresponding second corrugated-cardboard ply 11. At the same time, the heat within the upper second arcuate hot plate 5 is transmitted to the glue on the underside of the third corrugated-cardboard ply 10, whereas the heat within the lower second arcuate hot plate 5 is transmitted to the glue under the upper second corrugated-cardboard ply 11, whereas the heat within the first arcuate hot plate 2 is transmitted to the glue under the lower second corrugated-cardboard ply 11 via the first corrugated-cardboard ply 12, such that, prior to the bonding of the third corrugated-cardboard ply 10, the second corrugated-cardboard plies 11 and the first corrugated-cardboard ply 12, the glue can reach a temperature such that it is possible to achieve optimum bonding capability, and a multi-ply corrugated cardboard 13*a* with high quality is output if the third corrugated-cardboard ply 10, the second corrugated-cardboard plies 11 and the first corrugated-cardboard ply 12 are connected correctly.

The degree of bonding between the second arcuate hot plates 5 and the second corrugated-cardboard plies 11 can be finely adjusted using the respective fine adjustment means 9, provided below the sleeve 4, for the manual adjustment of the position of the sleeve 4, in order to ensure that the second corrugated-cardboard plies 11 can receive the maximum amount of heat.

In the case of the production of lightweight cardboard, or in the event of a malfunction of the two-sided machine 9*a*, the respective second arcuate hot plate 5 is rapidly removed from the surface of the corresponding second corrugated-cardboard ply 11 by means of the connecting rod 7 of the corresponding cylinder unit 6, in order to prevent excessive amounts of heat from adversely affecting the bonding capability of the glue.

The temperature of the surface plies of the second corrugated-cardboard plies 11 can be increased by means of the second hot plates 5, which improves the drying and adhesive bonding of the corrugated cardboard 13*a*.

It has been found that the corrugated-cardboard material has an insulating action, wherein, in general, a long free run of the heated surface plies has a cooling and dehumidifying effect. According to the invention, the introduction of energy is selected so as to take place directly after the application of glue by means of the gluing apparatus 55, and the so-called free run of the heated surface plies of the second corrugated-cardboard plies 11 is kept as short as possible.

In this way, the amount of web present between the preheating device 53 and the adhesive-bonding point 72 in the two-sided machine 9*a* can be considerably shortened. By means of the curved second hot plates 5, it is possible in particular to realize a shortening of the corrugated-cardboard production line in the case of low production speeds, because it is thus possible, in the case of production speeds of up to 140 m/min, for the otherwise required preheating device 55 to be omitted.

Consequently, the cooling and dehumidification of the corrugated-cardboard plies 10, 11, 12 can be considerably reduced, which minimizes the risk of warping. By means of the application or introduction of moisture and heat to the respective surface ply or to glued tips of the respective corrugated ply, the fibers of the corresponding surface ply are opened.

In particular, the two second hot plates 5 are pivoted in order to influence the contact time between these and the second corrugated-cardboard ply 11 that lies against them. The temperature of the second corrugated-cardboard plies 11 can be adjusted by means of the respective contact time thereof with the second hot plate 5 that guides them. The further the piston rod or connecting rod is deployed, the larger the contact area between the respective second corrugated-cardboard ply 11 and the corresponding second hot plate 5, and the longer the heating time. The reverse situation applies if the respective piston rod or connecting rod is retracted further.

During operation, water is sprayed onto the second hot plates 5, in particular onto the downwardly directed guide surfaces thereof for the respective second corrugated-cardboard plies 11, by the corrugated-cardboard steam/water-spraying devices 70 and/or the corrugated-cardboard saturated-steam-generating devices 71. The water flow rate can be metered. It is expediently selected as a function of the corrugated-cardboard production line speed, the width of the corrugated-cardboard plies 12, 11, 10 and/or the type of corrugated-cardboard plies 12, 11, 10. It is advantageous if the water is sprayed onto the second hot plates 5 in the running direction of the corrugated-cardboard plies 12, 11, 10.

The water evaporates on the second hot plates 5 and thus has an evaporation temperature of approximately 100° C., and is present in the saturated state. The steam thereby generated expediently fills a space between the respective second hot plate 5 and the second corrugated-cardboard ply 11 that is guided thereon. Said space thus forms a steam space. Since the spraying devices 70 and 71 and the steam space that is formed are adjacent to the respectively guided corrugated-cardboard web 11, the steam condenses at relatively cold locations, and the volume of the corrugated-cardboard plies 11 is filled with saturated steam.

Alternatively or in addition, water and/or steam is sprayed onto the respective corrugated-cardboard plies 12, 11, 10 by the corrugated-cardboard steam/water-spraying devices 70 and/or the corrugated-cardboard saturated-steam-generating devices 71.

Downstream of the two-sided machine 9*a*, the corrugated-cardboard production line expediently also has at least one cross-cutting means (not illustrated) for cross-cutting the multi-ply corrugated cardboard 13, 13*a* into individual sheets.

In a further embodiment which is not illustrated, the corrugated-cardboard production line does not have a preheating device 53 with heating rolls 54, such that the intermediate storage devices 51, 52 are followed directly or immediately by the gluing apparatus 55.

In an alternative embodiment (not illustrated), the two-sided machine has no heating elements 57.

In an alternative embodiment (not illustrated), the two-sided machine has no heating elements 57. Furthermore, it is also the case that no preheating device 53 with heating rolls 54 is provided. The corrugated-cardboard production line expediently has no heating means, such as heating elements 57, preheating device 53 or the like, at a spacing of between 1 m and 5 m from the hot plates 2, 5.

Combinations of the individual embodiments are possible.

While specific embodiments of the invention have been shown and described in detail to illustrate the application of the principles of the invention, it will be understood that the invention may be embodied otherwise without departing from such principles.

The invention claimed is:

1. A heating device, comprising:

two preceding arcuate hot plates, of a two-sided machine, having a stand, the two preceding arcuate hot plates comprising a first arcuate hot plate and a second arcuate hot plate, the stand having the first arcuate hot plate with a first heat-conducting plate element which has a first arcuate shape in cross section and in which a first heating means is provided, the first arcuate hot plate being configured such that heat within the first arcuate hot plate is transmitted to glue under a second corrugated-cardboard ply via a first corrugated-cardboard ply, the second arcuate hot plate being configured such that heat within the second arcuate hot plate is transmitted to the second corrugated-cardboard ply and is simultaneously transmitted to glue on an underside of a third corrugated-cardboard ply, the stand having a wall to which a connecting element is connected, the second arcuate hot plate being arranged above the first arcuate hot plate and the second arcuate hot plate having a second heat-conducting plate element which has a second arcuate shape in cross section and in which a second heating means is provided, wherein a middle or leading end of the second arcuate hot plate is connected to the connecting element by a connecting stem, wherein a rotary pair is formed between the second arcuate hot plate and the connecting element, the stand having a cylinder unit, the cylinder unit comprising a piston rod, the piston rod being connected to a trailing end of the second arcuate hot plate by a connecting rod.

2. A heating device as claimed in claim 1, wherein the first heat-conducting plate element and the second heat-conducting plate element are provided at a paper inlet of the two-sided machine, wherein the second arcuate hot plate is rotatable via at least the cylinder unit.

3. A heating device as claimed in claim 1, wherein each of the first heat-conducting plate element and the second heat-conducting plate element comprises two or more heating lines which are spaced apart along a direction of extent of an arc, wherein an axial direction of each of the two or more heating lines is parallel to a longitudinal direction of the first heat-conducting plate element and of the second heat-conductive plate element, and the two or more heating lines contain a heating medium.

4. A heating device as claimed in claim 1, wherein the connecting element is connected to the wall by screws which extend through slots provided in the connecting element.

5. A heating device as claimed in claim 1, wherein a fine adjustment means for a manual adjustment of a position of the connecting element is arranged below the connecting element and the fine adjustment means is provided in the stand.

6. A heating device as claimed in claim 1, wherein the two preceding arcuate hot plates are arranged directly adjacent to an upstream adhesive-bonding point of the two-sided machine.

7. A heating device as claimed in claim 6, wherein the two preceding arcuate hot plates have a spacing to the adhesive-bonding point, wherein the spacing is greater than or equal to ten centimeters and less than or equal to one-hundred centimeters.

8. A heating device as claimed in claim 1, further comprising:

at least one corrugated-cardboard saturated-steam-generating device for applying saturated steam to at least one of the first corrugated-cardboard ply, the second corrugated-cardboard ply and the third corrugated-cardboard ply, wherein the at least one corrugated-cardboard saturated-steam-generating device expediently wets the second arcuate hot plate with water for evaporating the water.

9. A heating device as claimed in claim 8, wherein the at least one corrugated-cardboard saturated-steam-generating device is arranged adjacent to the second arcuate hot plate.

10. A heating device as claimed in claim 1, further comprising:

at least one corrugated-cardboard steam/water-spraying device.

11. A heating device as claimed in claim 10, wherein the at least one corrugated-cardboard steam/water-spraying device is arranged adjacent to the second hot plate.

12. A heating device as claimed in claim 8, wherein the second arcuate hot plate and the at least one of the first corrugated-cardboard ply, the second corrugated-cardboard ply and the third corrugated-cardboard ply guided along said second hot plate spatially delimit a respective steam space for applying steam to said at least one of the first corrugated-cardboard ply, the second corrugated-cardboard ply and the third corrugated-cardboard ply.

13. A heating device as claimed in claim 1, wherein a contact time between the second hot plate and at least one of the first corrugated-cardboard ply, the second corrugated-cardboard ply and the third corrugated-cardboard ply guided at the second hot plate is adjustable.

14. A heating device as claimed in claim 1, wherein at least one of an unilaterally laminated corrugated-cardboard ply and a laminating ply remains unheated as far as the heating device.

15. A two-sided machine, comprising:

at least one table;

at least one pressing element arranged adjacent to the table;

a pressing gap, which is present between the at least one table and the at least one pressing element, for lead-through of corrugated-cardboard plies with formation of corrugated cardboard, the corrugated-cardboard plies comprising a first corrugated-cardboard ply, a second corrugated-cardboard ply and a third corrugated-cardboard ply;

a stand; and a heating device comprising two preceding arcuate hot plates, the two preceding arcuate hot plates comprising a first arcuate hot plate and a second arcuate hot plate, the stand having the first arcuate hot plate with a first heat-conducting plate element which has a first arcuate shape in cross section and in which a first heating means is provided, the first arcuate hot plate being configured such that heat within the first arcuate hot plate is transmitted to glue under the second corrugated-cardboard ply via the first corrugated-cardboard ply, the second arcuate hot plate being configured such that heat within the second arcuate hot plate is transmitted to the second corrugated-cardboard ply and is simultaneously transmitted to glue on an underside of the third corrugated-cardboard ply, the stand having a wall to which a connecting element is connected, the second arcuate hot plate being arranged above the first arcuate hot plate and the second arcuate hot plate having a second heat-conducting plate element which has a second arcuate shape in cross section and in which a second heating means is provided, wherein a middle or leading end of the second arcuate hot plate is connected to the connecting element by a connecting stem, wherein a rotary pair is formed between the second arcuate hot plate and the connecting element, the stand having a cylinder unit, the cylinder unit comprising a piston rod, the piston rod being connected to a trailing end of the second arcuate hot plate by a connecting rod.

16. A two-sided machine as claimed in claim 15, wherein one of the corrugated cardboard and the corrugated-cardboard plies remain(s) unheated in the pressing gap, wherein the second arcuate hot plate is rotatable via at least the cylinder unit.

17. A heating device as claimed in claim 8, wherein the at least one corrugated-cardboard saturated-steam-generating device is a constituent part of the second arcuate hot plate.

18. A heating device as claimed in claim 1, further comprising:

at least one upstream corrugated-cardboard steam/water-spraying device.

19. A heating device as claimed in claim 18, wherein the at least one corrugated-cardboard steam/water-spraying device is a constituent part of the second arcuate hot plate.

20. A heating device as claimed in claim 14, wherein the at least one of the unilaterally laminated corrugated-cardboard ply and the laminating ply remains unheated as far as the heating device up to a conveying speed of 200 m/min.

21. A heating device as claimed in claim 14, wherein the at least one of the unilaterally laminated corrugated-cardboard ply and the laminating ply remains unheated as far as the heating device up to a conveying speed of 140 m/min.

* * * * *